United States Patent [19]

Prigge

[11] Patent Number: 5,623,471

[45] Date of Patent: Apr. 22, 1997

[54] ADAPTIVE BACKUP FOR STORAGE LIBRARY

[75] Inventor: Carsten H. Prigge, Tucson, Ariz.

[73] Assignee: International Business Machines Corporation, Armonk, N.Y.

[21] Appl. No.: 249,772

[22] Filed: May 26, 1994

[51] Int. Cl.⁶ ...................................................... G11B 7/00
[52] U.S. Cl. .................. 369/84; 369/85; 369/58; 369/47; 360/15
[58] Field of Search .................. 369/32, 54, 58, 369/47, 48, 49, 83, 84, 85; 360/13, 15

[56] References Cited

U.S. PATENT DOCUMENTS

| | | | |
|---|---|---|---|
| 4,707,750 | 11/1987 | Anderson et al. | 360/15 X |
| 5,325,238 | 6/1994 | Stebbings et al. | 360/15 |
| 5,327,296 | 7/1994 | Nagasawa | 360/15 |

*Primary Examiner*—Muhammad N. Edun
*Attorney, Agent, or Firm*—D. A. Shifrin

[57] ABSTRACT

In an automated information storage and retrieval library system having a single recording drive, a backup or copying operation is preferably performed in a single-threaded fashion whereas in a library having two or more drives, a multi-threaded approach is preferred. The present invention provides a library with the capability to back up information from one piece of media to another in an adaptive fashion. A determination is made whether there is one drive unit available in the library or whether at least two are available. A multi-threaded backup approach is employed if there are two available recording drives in the library and a single-threaded approach is employed if there is only one available drive. In addition to making the determination when a copy request is received, the library controller can make the determination at various stages of a copy operation and adaptively change between single-threaded and multi-threaded approaches.

13 Claims, 3 Drawing Sheets

ADAPTIVE BACKUP FOR STORAGE LIBRARY

TECHNICAL FIELD OF THE INVENTION

The present invention relates to automated information storage and retrieval library systems, and in particular, to backing up information from one piece of media to a second piece of media in an adaptive fashion whereby a multi-threaded approach is taken if there are two available recording drives in the library and a single-threaded approach is taken if there is only one available drive.

BACKGROUND OF THE INVENTION

Automated storage and retrieval library systems (including smaller jukeboxes) are used to store large numbers of recording media, such as optical disks or magnetic tape cartridges, in order to maintain large amounts of data available to a host computer. (As used herein, the term "cartridge" will refer to any form of data storage media and its carrier, including, without limitation, magnetic tape cartridges and cassettes and optical disk cartridges and trays.) The library operator may desire to backup or copy certain data from one cartridge to another for archival or security purposed. Two approaches can be used. If the library has a single drive unit, a "single-threaded" procedure is employed as follows: the cartridge on which the data to be copied is located (the source cartridge) is mounted in the drive and data is read from the cartridge into a memory buffer in the library controller or some other location. When the buffer is full, or if all of the data has been read without completely filling the buffer, the source cartridge is removed and another cartridge (the target cartridge) is mounted. Data is then copied from the buffer to the target cartridge. The process is repeated until all of the data has been copied from the source to the target.

On the other hand, if the library is equipped with two or more drives, a "multi-threaded" procedure is employed as follows: both the source cartridge and the target cartridge are loaded into two of the available drives. Data is copied from the source first into one buffer and then into another; while the data is being copied into the second buffer, the data in the first buffer is written to the target. When the second buffer is full and the first buffer is "empty" (completely copied to the target), the process reverses whereby data is copied into the first buffer while the data in the second buffer is written to the target.

It will be apparent that, while the multi-threaded approach can be used in a single-drive library, it can cause "race conditions" when attempting to access the source and target cartridges, thereby resulting in unnecessary cartridge swaps and mounts. It will also be apparent that a single-threaded approach can be used in a multi-drive library but would not take advantage of the efficiency and speed provided by multiple drives. However, even in a multi-drive library, there may be situations in which only one drive is available or functional, for example if the other drives are occupied or out of service. In such situations, a multi-threaded process performs poorly, causing many cartridge mounts, and a single-threaded process is not typically available.

SUMMARY OF THE INVENTION

In view of the foregoing, it is an object of the present invention to optimize data copy and backup operations in an automated library regardless of the number of available drives. Such optimization can increase the speed and performance of the library by reducing the number of mounts performed and can also extend the operational life of the cartridge accessor.

This object and others are achieved in this invention by providing an adaptive approach to data copy and backup operations whereby a multi-threaded approach is employed if the library has at least two drives available and a single-threaded approach is employed if the library has only one drive available.

The foregoing and other features and advantages of the invention will be apparent from the following more particular description of preferred embodiments of the invention, as illustrated in the accompanying drawings.

DETAILED DESCRIPTION OF THE INVENTION

Figure 1:
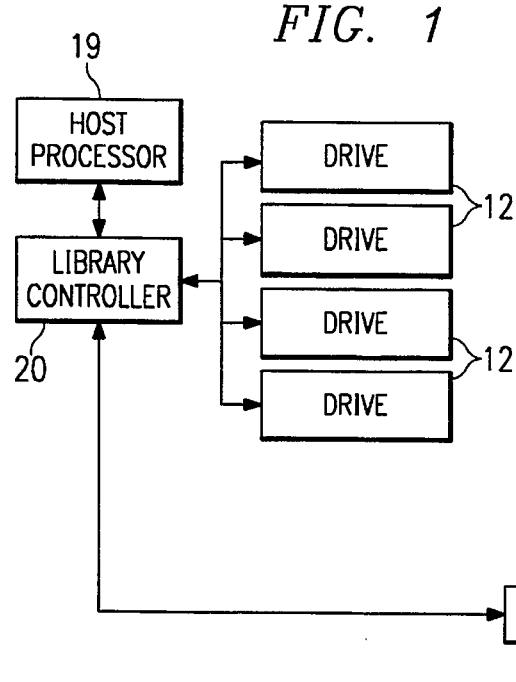
FIG. 1 is a block diagram of an automated storage and retrieval library system in which the present invention can be incorporated.

FIG. 1 is a simplified block diagram of an automated information storage and retrieval library system 10. Although the invention will be described with particular reference to optical libraries, it is equally applicable to magnetic tape libraries as well. The library 10 includes one or more drive units 12, an array of storage cells 14 for retaining media cartridges 16, a mechanical accessor 18 for transporting media between the cells and the drives, and a controller 20 for receiving commands from a host processor 19 and for directing the operation of the drive(s) 12 and accessor 18 in response to the commands.

Figure 2:
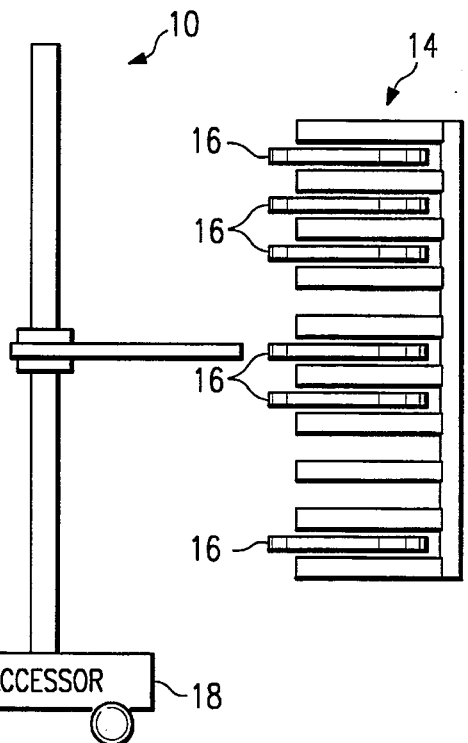
FIG. 2 is functional block diagram illustrating a multi-threaded backup system.
Figure 2:
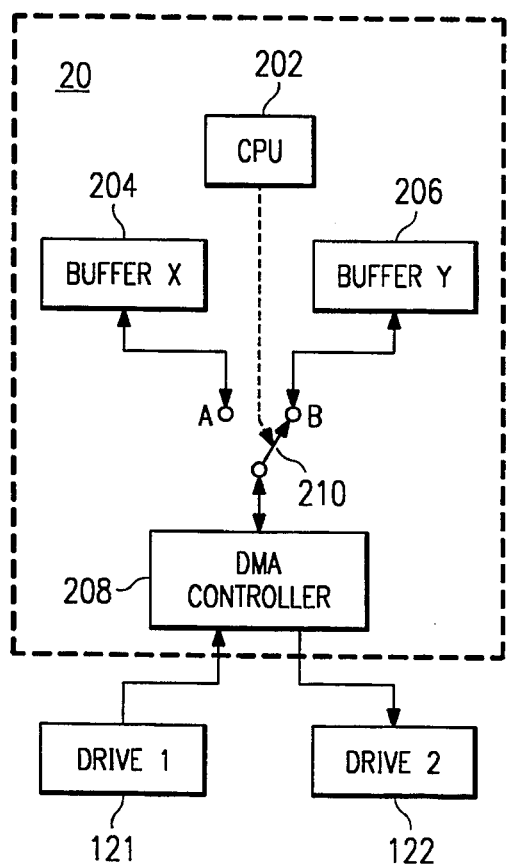

FIG's. 2 and 3 illustrate functionally the operation of multi-threaded and single-threaded backups, respectively. In FIG. 2, the controller 20 includes a processor 202, memory allocated to two buffers X 204 and Y 206, a direct memory access (DMA) controller 208 and the equivalent of a single-pole, double-throw switch 210 under the control of the processor 202. Drives 121 and 122 contain the source and target cartridges, respectively. When the switch 210 is in a first position (position A in FIG. 2), data from the source drive 121 is copied into the first buffer X 204 through the DMA controller 208 or data in the first buffer X 204 is written to the target drive 122. When the switch 210 is in a second position (position B), data from the source drive 121 is copied into the second buffer Y 206 or any data in the second buffer Y 206 is written to the target drive 122.

Figure 3:
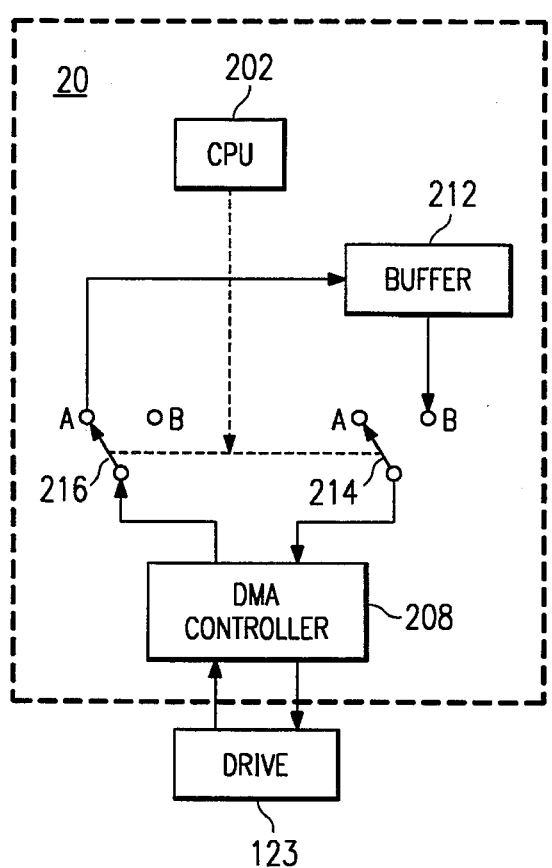
FIG. 3 is a functional block diagram illustrating a single-threaded backup system.
Figure 4:
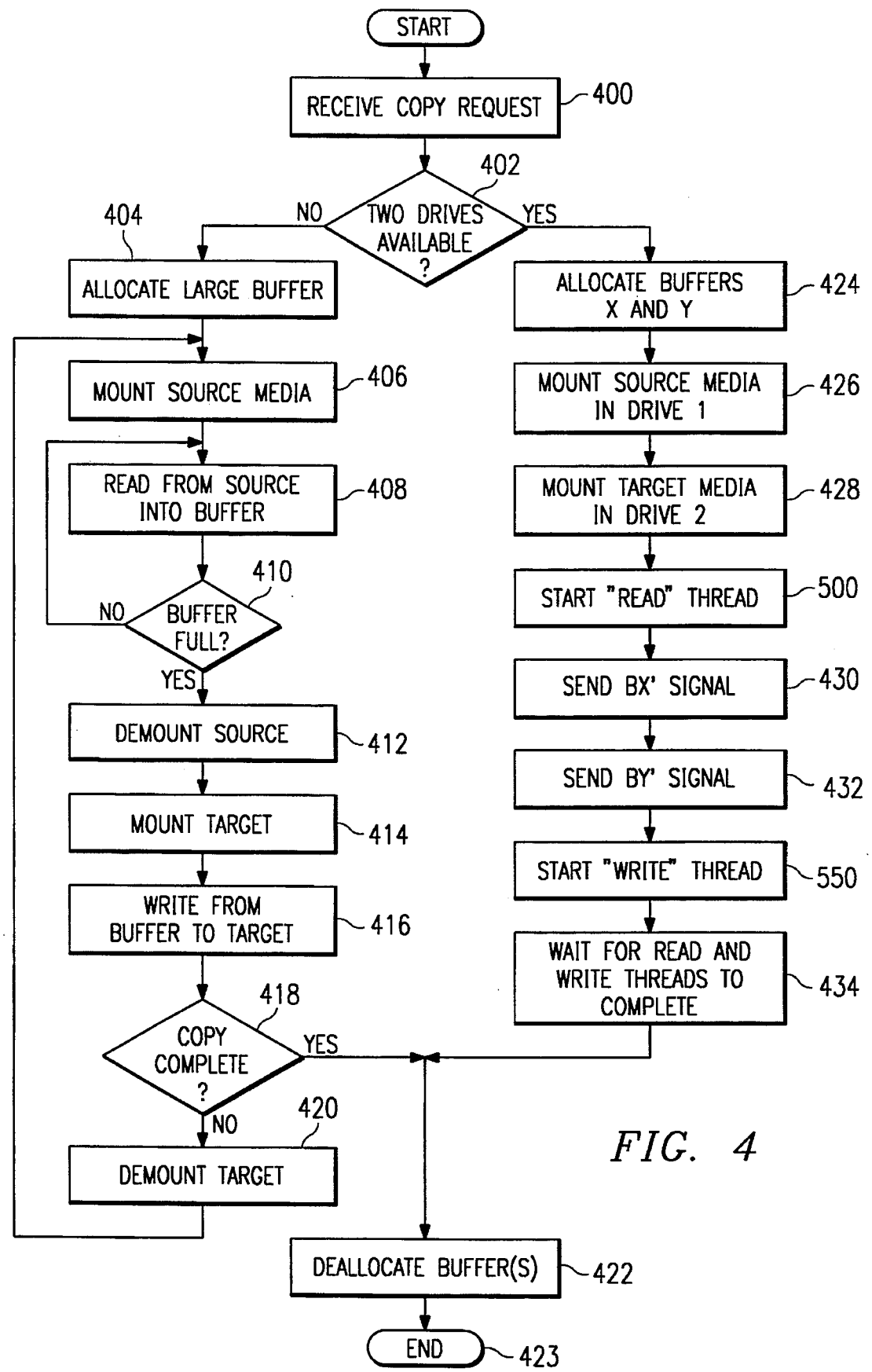
FIGS. 4 and 5 are flow charts of the adaptive system of the present invention.

In FIG. 3, the controller 20 includes the processor 202, the DMA, controller 208 memory allocated to a single large buffer 212 (or to several smaller, linked buffers) and two linked single-pole, double-throw switches 214 and 216. The single drive 123 alternately contains the source and target cartridges. When the source cartridge is mounted in the drive 123, the switches 214 and 216 are in position A allowing the data to be read from the source cartridge through the DMA controller 208 and into the buffer 212. When the buffer 212 is full, the source cartridge is replaced in the drive 123 with the target cartridge and the switches 214 and 216 moved to position B to allow the buffer contents to be written to the target cartridge.

FIG's. 4 and 5 are flow charts of a method of the present invention. When a copy or backup request is received from the host 19 by the controller 20 (Step 400), the controller 20 determines whether two drives are available (present and functional) (Step 402). The method employed to determine the number of available drives in the library is not based upon the library configuration itself because, as previously noted, a multi-drive library can have fewer drives available than are physically installed. Rather, the determination preferably is made on an on-going or periodic basis during copy operations. The time to perform source and target disk mounts may determine whether one drive or more than one drive is available. The availability determination is preferably performed at the beginning of each copy or backup operation and may also, optionally, be performed during the actual copy or backup operation to adapt to changes in the environment. For example, during a multi-threaded backup operation, a drive may fail or service a request from a host, leaving only one available drive. Changing from the multi-threaded (concurrent) approach to the single-threaded (sequential) approach optimizes speed performance. Moreover, additional drives may become available after beginning a single-threaded backup due to the completion of other host requests. In such an event, performance is enhanced by changing from the single- to multi-threaded backup.

At the beginning of a backup or copy operation, if only one drive 123 (FIG. 3) is available (or if the library only contains a single drive), the single-threaded mode is invoked beginning with the allocation of a large amount of memory to the buffer 212 (Step 404). The controller 20 directs the accessor 18 to retrieve and mount the source cartridge on which the data to be copied is located (Step 406) and the source data is read from the drive 123 (Step 408) into the buffer 212. When the buffer is full (Step 410), the source cartridge is demounted (Step 412) and replaced in the drive 123 with the target cartridge (Step 414). The data in the buffer 212 is written to the target cartridge (Step 416) and the controller 20 inquires whether the copy is complete (Step 418). If so, the large buffer 212 is deallocated (Step 422) and the procedure ends (Step 423). If not, the controller 20 directs that the target cartridge be replaced by the source cartridge; the procedure repeats until all of the data has been copied from the source to the target.

If, however, the controller determines in Step 402 that two drives 121 and 122 (FIG. 2) are available, the controller 20 allocates memory for two buffers X and Y 204 and 206 (Step 424). The controller 20 then directs that the source cartridge be mounted in one drive 121 (Step 426) and the target cartridge be mounted in another drive 122 (Step 428). A "read" thread begins (Step 500) followed by the sending of BX' and BY' signals (Steps 430 and 432) indicating that the two buffers X and Y 121 and 122 are empty and ready to accept data. A "write" thread is then begun (Step 550) and the controller waits for the two threads to finish (Step 434) before buffers X and Y 204 and 206 are deallocated (Step 422) and the procedure ends (Step 424).

Figure 5:
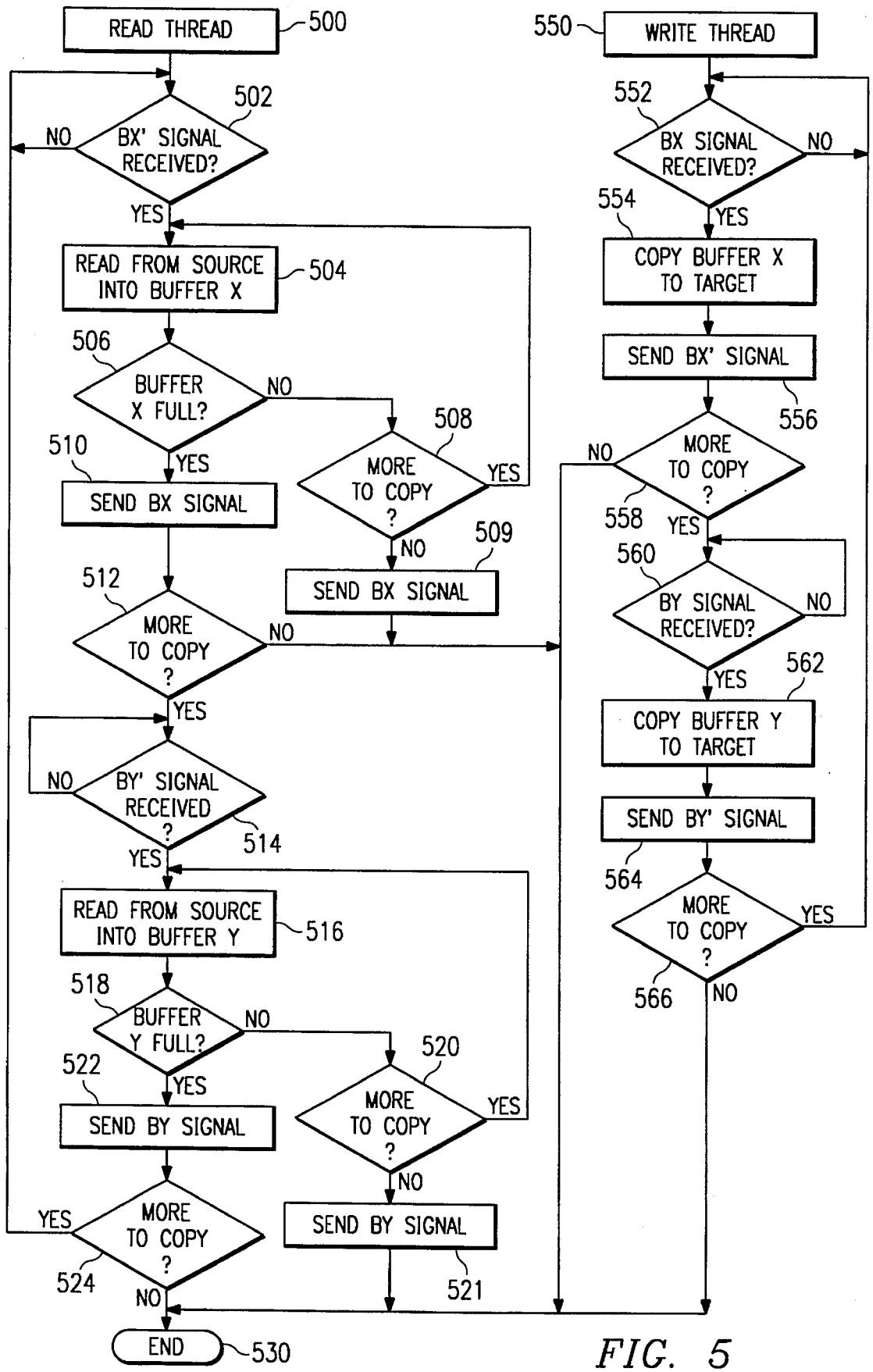

FIG. 5 is a flow chart of the concurrent read and write threads 500 and 550. Turning first to the read thread, when the BX' signal is received (Step 502), source data is read from the first drive 121 into buffer X 204 (Step 504). As long as buffer X 204 is not full and more data remains to be copied (Step 508), the source data is read into buffer X 204. If buffer X 204 is not full (Step 506) and there is no more data to copy (Step 508), a BX signal is sent (Step 509), indicating that buffer X 204 is ready to be written to the media, and the read thread ends (Step 530).

When buffer X 204 is full, a BX signal is transmitted (Step 510) and it is determined whether more data is to be copied (Step 512). If not, the read thread ends (Step 530). However, if there is more data to copy, the controller 20 waits until the BY' signal is received (Step 514), indicating that buffer Y 206 is empty and available to receive data, whereupon data is read from the source into buffer Y 206 (Step 516). If buffer Y 206 is not full (Step 518) and there is more data to copy (Step 520), more data is read from the source (Step 516); if buffer Y 206 is not full (Step 518) but there is no more data to copy (Step 520), a BY signal is sent (Step 521), indicating that buffer Y 206 is ready to be written to the media. Similarly, when buffer Y 206 is full (Step 518), the BY signal is transmitted (Step 522) and it is again determined whether there is more data to copy (Step 524). If not, the read thread ends (Step 530); otherwise, the controller 20 waits until the BX' signal is received (Step 502), indicating that buffer X 204 is empty and available to receive data, and the process repeats until no further data remains on the source to be copied.

Turning now to the write thread, beginning at Step 550, which occurs concurrently with the read thread, the controller 20 waits until the BX signal is received (Step 552), indicating that buffer X 204 is full, and writes data from buffer X 204 to the target (Step 554). The BX' signal is then sent (Step 556) and it is determined whether there is more data to write to the target (Step 558). If so, the controller 20 waits until the BY signal is received (Step 560), indicating that buffer Y 206 is full, whereupon the data in buffer Y 206 is copied to the target (Step 562) and the BY' signal is sent (Step 564). If there is still more to write to the target (Step 566), the controller 20 again waits for the BX signal (Step 552) and the process repeats until all of the data has been written to the target cartridge. On the other hand, if there is no more data to be written ( Steps 558 or 566 ), the write thread ends ( Step 530).

Because of contention on the system bus, the read and write threads 500 and 550 are not actually processed in parallel (simultaneously). Rather, the threads are processed concurrently in a multi-processing manner as if the switches 214 and 210 rapidly change states giving the appearance and performance approaching that of simultaneous processing.

While the invention has been particularly shown and described with reference to preferred embodiments thereof, it will be understood by those skilled in the art that various changes in form and details may be made therein without departing from the spirit and scope of the invention.

What is claimed is:

1. A method for copying data from a source media to a target media in an automated data storage and retrieval library, comprising the steps:

receiving a copy request from a host device;

determining the number of available drive units in the library;

performing a single-threaded copy process if the number of available drive units is one; and performing a multi-threaded copy process if the number of available drive units is greater than one by:
allocating first and second buffers out of a memory store;
mounting the source media in a first drive unit;
mounting the target media in a second drive unit;
performing a read thread;
sending a first signal indicating that the first buffer is available;
sending a second signal indicating that the second buffer is available;

performing a write thread concurrently with the read thread; and when all of the data to be copied from the source media has been written to the target media, deallocating the first and second buffers.

2. The method of claim 1, wherein said step of performing a single-threaded copy process comprises the steps of:

allocating a buffer out of a memory store;

mounting the source media in the one available drive unit;

reading data to be copied from the source media into the buffer until the earlier of the buffer becoming full or until all of the data to be copied has been read;

demounting the source media from the drive unit;

mounting the target media in the drive unit;

writing the data to be copied from the buffer to the target media until all of the data in the buffer has been written;

if all of the data to be copied from the source media has been written to the target media, deallocating the buffer;

if not all of the data to be copied from the source media has been written to the target media, demounting the target media from the drive unit, mounting the source media in the drive unit and performing the foregoing reading and writing steps until all of the data to be copied has been written to the target media.

3. The method of claim 1, wherein said step of performing the read thread comprises the steps of:

receiving the first signal;

reading data from the source media into the first buffer until the earlier of the first buffer being full or all of the data to be copied from the source media being read into the first buffer;

sending a third signal indicating that the first buffer is full;

determining whether there is more data to be read from the source media;

if there is not more data to be read from the source media, ending the read thread;

if there is more data to be read from the source media and the second signal has been received, reading data from the source media into the second buffer until the earlier of the second buffer becoming full or all of the remaining data to be copied from the source media being read into the second buffer;

sending a fourth signal indicating that the second buffer is full;

determining whether there is more data to be read from the source media; and if there is not more data to be read from the source media, ending the read thread.

4. The method of claim 3, wherein said step of performing the write thread comprises the steps of:

receiving the third signal indicating that the first buffer is full;

writing data from the first buffer to the target media;

sending the first signal indicating that the first buffer is available;

if there is more data to write to the target media, waiting until the fourth signal is received and writing data from the second buffer to the target media;

sending the second signal indicating that the second buffer is available; and if there is not more data to be written, ending the write thread.

5. The method of claim 1, further comprising the steps of:

determining the number of available drive units in the library periodically while a copy operation is being performed;

changing from a single-threaded copy operation to a multi-threaded copy operation if the number of available drive units increases to more than one; and changing from a multi-threaded copy operation to a single-threaded copy operation if the number of available drive units decreases to one.

6. The method of claim 1, wherein the source media and the target media are optical disks.

7. The method of claim 1, wherein the source media and the target media are magnetic tape.

8. An automated information storage and retrieval library, comprising:

at least one drive unit;

a plurality of storage cells for storing media;

an accessor for transporting media between said storage cells and said drive unit;

a controller for controlling said accessor and said drive unit and for exchanging data and commands with a host processor;

a memory store;

means for determining how many of said at least one drive unit are available in the library;

means for allocating said memory store to one buffer and performing a single-threaded copy operation if said determining means determines that there is one available drive unit in the library; and means for allocating said memory store to first and second buffers and performing a multi-threaded copy operation if said determining means determines that there are at least two available drive units in the library.

9. The library of claim 8, wherein said means for performing a multi-threaded copy operation comprises:

means for performing a read thread; and means for performing a write thread concurrently with the read thread.

10. The library of claim 9, wherein:

said means for performing the read thread comprises:
first means for transmitting a first signal when said first buffer is available; and
second means for transmitting a second signal when said second buffer is available; and said means for performing the write thread comprises:
third means for transmitting a third signal when said first buffer is full; and
fourth means for transmitting a fourth signal when said second buffer is full.

11. The library of claim 10, wherein:

said means for performing the read thread further comprises means for reading data to be copied from a source media into said first buffer when said first means transmits the first signal; and said means for performing the write thread further comprises means for writing data from the first buffer to a target media when said third means transmits the third signal.

12. The library of claim 11, wherein:

said means for performing the read thread further comprises means for reading the data to be copied from a source media into said second buffer when said first means transmits the second signal; and said means for performing the write thread further comprises means for writing data from the second buffer to a target media when said third means transmits the fourth signal.

13. A method for copying data from a source media to a target media in an automated data storage and retrieval library, comprising the steps:

receiving a copy request from a host device;

determining the number of available drive units in the library periodically while a copy operation is being performed;

changing from a single-threaded copy operation to a multi-threaded copy operation if the number of available drive units increases to more than one; and changing from a multi-threaded copy operation to a single-threaded copy operation if the number of available drive units decreases to one;

wherein a single-threaded copy operation comprises the steps of:

allocating a buffer out of a memory store;

mounting the source media in an available drive unit;

reading data to be copied from the source media into the buffer until the earlier of the buffer becoming full or all of the data to be copied has been read;

demounting the source media from the drive unit;

mounting the target media in the drive unit;

writing the data to be copied to the target media from the buffer until all of the data in the buffer has been written;

if all of the data to be copied from the source media has been written to the target media, deallocating the buffer;

if not all of the data to be copied from the source media has been written to the target media, demounting the target media from the drive unit, mounting the source media in the drive unit and performing the foregoing reading and writing steps until all of the data to be copied has been written to the target media; and wherein a multi-threaded copy operation comprises the steps of:

allocating first and second buffers out of a memory store;

mounting the source media in a first drive unit;

mounting the target media in a second drive unit;

performing a read thread;

sending a first signal indicating that the first buffer is available;

sending a second signal indicating that the second buffer is available;

performing a write thread concurrently with the read thread; and when all of the data to be copied from the source media has been written to the target media, deallocating the first and second buffers.

* * * * *